Aug. 21, 1962  D. C. MEYERS  3,050,125
APPARATUS FOR PRODUCING HIGH PRESSURE WELLS
Filed May 27, 1960
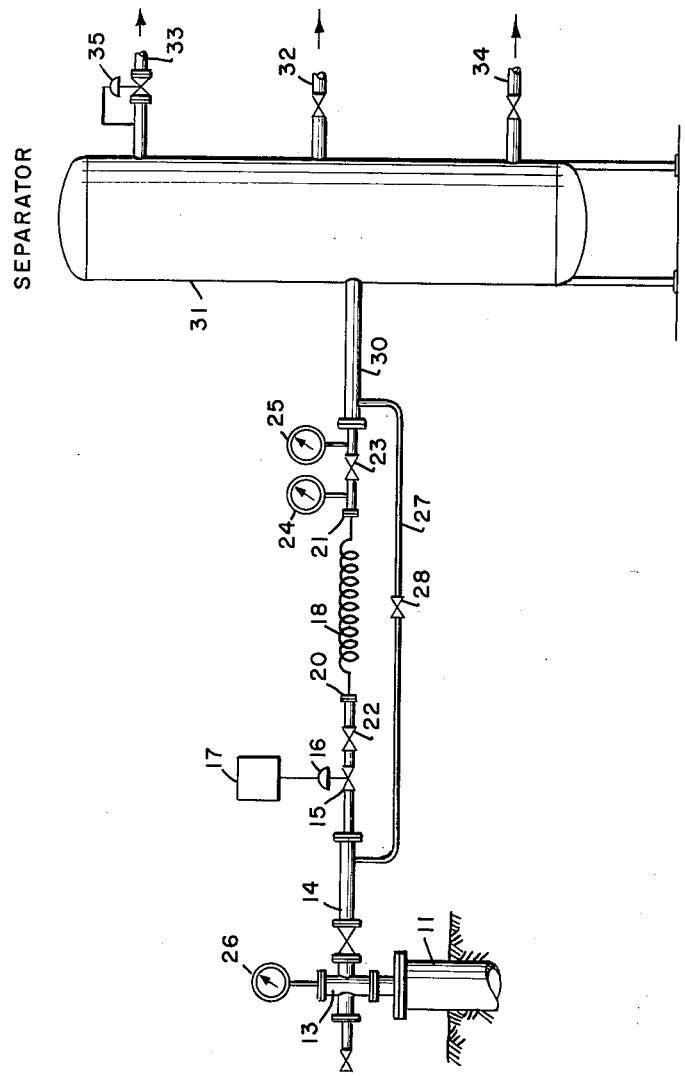
INVENTOR
D.C. MEYERS
BY J.H. McCarthy
HIS AGENT United States Patent Office 3,050,125
Patented Aug. 21, 1962

3,050,125
APPARATUS FOR PRODUCING HIGH PRESSURE WELLS
Douglas C. Meyers, Metairie, La., assignor to Shell Oil Company, New York, N.Y., a corporation of Delaware
Filed May 27, 1960, Ser. No. 32,185
4 Claims. (Cl. 166—91)

This invention relates to apparatus for producing a high pressure well and pertains more particularly to apparatus for producing a multi-phase emulsifiable well fluid of oil and water, or gas, oil and water from a high pressure well into a chamber or pipeline of substantially lower pressure in a manner such as to prevent the freezing of any wet high pressure gas which may be present and to prevent homogenization of oil and water mixtures.

In many oil fields, hydrocarbons exist in the producing formation under high pressure. When a well is drilled into a high pressure formation of this type, the production fluid obtained therefrom normally consists of a hydrocarbon fluid and water under pressure. In some wells the multi-phase production fluid consists of oil, gas and water whereas in other wells under high pressure the gas phase of the production fluid within the formation and within the well is often in liquid form until the pressure of the production fluid has been reduced upon leaving the well. At this time a portion of the oil phase of the production fluid becomes gas.

One of the problems encountered in producing wells is the control of flow rates from gas and oil wells. In order to control the flow rate of production fluid from a high pressure well and reduce the pressure thereof, the production flowline from a wellhead assembly is normally provided with a flow control device, known as a choke. The positive or adjustable choke is a device in almost universal use for controlling flow rates from wells.

The choke, while being a very economical and in most cases an accurate device for controlling well flow rates, has a number of undesirable features which have more or less been accepted as unavoidable by the industry. These undesirable features include the following. Being an orifice, there is a tendency for any moisture to freeze when wet gas is being produced through a choke used with high differentials between the upstream and downstream pressures. Additionally, oil and water mixtures passing through the choke have a tendency to become homogenized when the pressure differential across the choke is large, thus making separation of the resultant oil and water emulsion quite difficult and expensive. It is often difficult to obtain exact flow rates desired when small diameter chokes are employed due to relatively large changes in the flow rates due to small changes in the opening of the choke. Also, due to the extremely high speed of flow through the small openings of the choke, erosion and resulting enlargement of the opening are of major concern particularly where any solids are present in the fluid stream or the fluid is corrosive by nature. Further, the openings of some chokes are very small in diameter, often being in the order of a few 64ths of an inch, and thus have a tendency to become plugged with foreign matter such as rubber, scale, plastic, etc.

It is fairly well established that the formation of an oil-water emulsion from a flowing oil well is caused primarily by the conventional flow control device or choke in the production line from the well, when the pressure reduction of the fluid stream exceeds that which produces a critical velocity of the stream as the stream passes through the choke. Critical velocity for gas is reached when the reduced pressure or the pressure downstream of the choke is less than .52 to .58 that of the pressure upstream of the flow control device. Since gas is produced from oil wells along with oil and water, a pressure drop greater than that which would cause critical velocity, causes the produced gas to exit from the restriction of the flow control device with an internal pressure greater than the downstream pressure so that the gas more or less explodes from the exit of the flow control device and causes the water and oil to be broken into extremely small droplets, in much the same manner as an atomizer or sprayer, and produces a homogeneous mixture or emulsion of oil and water which becomes difficult to separate or "break" except by the application of heat, the addition of chemicals or other treating methods. It has been found that oil and water do not become homogenized or emulsified if the pressure drop across the flow control device or other restriction is maintained at less than that which causes critical velocity of the gas, thus allowing the oil and water to be separated quite easily.

It is therefore a primary object of the present invention to provide apparatus for producing a multi-phase emulsifiable fluid of gas, oil and water from a high-pressure well and flow it into a low-pressure pipeline or separator apparatus without substantial emulsification of the multi-phase production fluid.

A further object of the present invention is to provide an apparatus for controlling the flow of a production fluid including wet gas without any danger of the flow control device freezing up.

Another object of the present invention is to provide a flow control device for maintaining exact flows in a pipeline while gradually reducing the pressure of the fluid flowing therethrough.

Still another object of the present invention is to provide a flow control device having little tendency to become clogged by foreign particles.

These and other objects of this invention will be understood from the following description when taken with reference to the attached drawing, wherein a schematic view of a wellhead is shown with a production flowline connected to a low-pressure pipeline and a separator.

The method of producing a multi-phase emulsifiable fluid of oil, gas and water from a high pressure subsurface formation in accordance with the present invention contemplates the drilling of a well in a high pressure field and containing the production fluid in the well with a suitable wellhead closure device equipped with a production discharge line through which production fluid may be discharged from the well while controlling the flow of the fluid stream and reducing the pressure of the fluid stream between the well and a low pressure pipeline or an oil and gas separator. The rate of pressure reduction of the flow stream is preferably controlled continuously wherein the ratio of the pressure downstream of each incremental stage to the pressure upstream thereof is a value above that which emulsification and atomization takes place within a multi-phase fluid which may be then discharged into a pipeline or chamber at a reduced pressure.

Referring to the drawing, the top of a well casing 11 is shown as being closed by a wellhead assembly which may include a Christmas tree 13 having a production discharge arm 14. A motor-controlled flow control valve 15 is positioned in the discharge conduit 14 and operated by a suitable motor 16 which may be in the form of a diaphragm, piston, solenoid, electric motor, etc., all of which are well known within the art. Operatively connected to the motor-controlled valve 15 is a time-controlled actuating device of any suitable type for periodically or intermittently actuating or energizing the motor 16 of the valve 15 to open or close the valve 15 on any desired time schedule.

Downstream of the motor-controlled valve 15 the flowline comprises an elongated section of small-diameter tubing 18 which is provided with suitable connectors, such as flanges 20 and 21 at either end thereof for connecting the tubing into the flowline. Valves 22 and 23 are provided for closing the flowline when it is desired to remove the section of tubing 18 therefrom. If desired, pressure gauges 24 and 25 may be provided downstream of said tubing 18 while the Christmas tree of the well may be provided with a pressure gauge 26 to measure the pressure at the wellhead. Preferably, a bypass line 27 having a shut-off valve 28 therein is provided for emergency purposes when it is desired to bypass fluid around the length of tubing 18.

The portion of the flowline 30 downstream of the tubing section 18 is at low pressure and may be connected to any suitable tank or to a separator 31 for separating oil, gas and water from the production and discharging them through conduits 32, 33 and 34 therefrom, respectively. A back pressure valve 35 is provided in the line 33 to control the pressure at which the separator operates.

The length of the tubing 18 is selected so that the fluid velocity within the tubing is below the critical velocity, i.e., so that a change in upstream or downstream pressure causes a proportionate change in the fluid velocity. The diameter of the tubing is preferably selected so that the flow rate therethrough is in excess of that required for producing the well. For example, in a given installation the tubing section is of a size that permits a flow that is say, twice that required to produce the daily allowable production from a well. The timing device 17 is then adjusted so that the motor-operated valve 15 permits flow from the well for only that portion of time to produce the daily allowable volume. If the diameter of the tubing 18 is such that the flow rate through the tubing is twice that required, then the timer 17 is adjusted so that the valve 15 would be closed to shut off the flow for 50 percent of the time. Employing a readily replaceable tubing section 18 permits changing of the tubing to sections having larger or smaller diameters, or of different lengths, to permit controlling the flow rate for different conditions of pressure, gas-liquid ratio, percentage of oil and water, total production allowed, etc.

An illustrated example of the operation of the apparatus of the present invention is given with regard to an oil well having a flowing pressure of 1500 p.s.i. which is connected to a separator having a pressure of 40 p.s.i. The allowable volume of fluid which can be produced from the well is 100 barrels of oil per day and the well produces 10 percent water and has a gas-oil ratio of 500 cubic feet to 1 barrel. It has been found by actual use of a positive choke for controlling the flow of fluid from the well that the choke must have a flow opening of 9/64 of an inch in order to restrict the rate of production from this well to the desired 111 barrels of total fluid. It is known that the 10% water present in the production fluid is more or less in a free state upstream of the choke, but upon passing through the choke all of the water becomes homogenized or tightly emulsified with the oil. The use of an expensive treating plant involving the application of heat and chemicals to break the emulsion is required and considerable settling time must be allowed to permit the separation of the water from the oil.

In order to replace the conventional choke of the above example with a section of tubing, tests are carried out and it was determined that a length of tubing 50 feet long having an internal diameter of ¼ of an inch with a pressure drop through the tubing of 1460 p.s.i. would allow 250 barrels of fluid per day to be produced through this tubing section without the velocity within the tubing exceeding a critical velocity which would cause an emulsion. In order to produce only 111 barrels of production fluid per day, it was necessary to set the timing apparatus 17 so as to stop the flow period 55½ percent of the total time, or allow the well to produce a total of 642 minutes per day. The timer may be adjusted to flow the well either intermittently or continuously for a specified period. By keeping the velocity through the tubing section 18 below that for critical velocity, the water and oil do not become homogenized and may be easily separated by allowing the water to settle out in a tank.

In the event that the percentage of water in the production fluid increases so that it is necessary to increase the total production to, say, 120 barrels per day, this could be done relatively easily with the apparatus of the present invention but would be very difficult when a conventional choke was being used. With the present apparatus, the timer 17 on the motor-operated flow control valve 15 would be adjusted to flow the well a total of 750 minutes per day to give 120 barrels per day production. On the other hand, if a conventional 9/64 of an inch choke was replaced by the next largest size, a 9/64 of an inch choke, the production fluid would be increased by roughly 42 percent or up to 158 barrels per day, which would be considerably more than that desired.

In the present apparatus, the timer cycle could be adjusted as desired up to the point where the timer maintained the valve open 100 percent of the time in order to secure increased production. Additional production would then be provided if necessary by merely replacing the tubing section 18 with one of a larger size. The tubing section 18 is preferably precoiled and sections of tubing having various lengths and internal diameters can be made up ahead of time so that it is a relatively simple matter to select a size and length of tubing to fit the conditions of each well.

Due to the fact that the gas in a production fluid expands as well as some of the liquid in the production fluid being converted to a vapor when pressure within the tubing is reduced, it is found desirable, and often necessary, on some wells to utilize lengths of tubing having different and increasing internal diameters toward the downstream end thereof in order to keep the velocity of the fluid low within the tubing. Otherwise, the velocity would have to increase as the pressure is reduced, with respect to the velocity at the entrance of the tubing, and the pressure drop would not be uniform for the complete length.

By employing the apparatus of the present invention numerous advantages are realized in controlling the flow of fluid from wells of high pressure. One advantage is that pressure reduction takes place over a considerable length of tubing so that there is no sudden pressure reduction thus reducing any possibility of freezing of water vapor in the fluid. Secondly, the velocity of the multi-phase fluid in the tubing is at all times below that necessary to produce homogenization of oil and water. Additionally, the velocity of fluid in the tubing is below that necessary to cause erosion or change in the internal diameter so that control remains constant so long as other conditions do not change. Through the use of a timer on the motor-operated valve, a more precise control of total flow is obtained since timing devices may be adjusted to at least ½ of 1 percent of the timer cycle. Additionally, since the internal diameter of a tubing employed is much larger than that of a choke for the equivalent flow rate therethrough, there is much less possibility of the tubing becoming plugged by small foreign material.

The exact length and internal diameter of the tubing to be used depends on the flow rates and the pressure reduction desired. It is realized that two or more parallel tubing sections 18 could be employed instead of a single one. The length of the tubing section also depends on whether the internal diameter of the tubing is the same throughout its length or whether it increases. For example, 200 feet of ¼ inch tubing has the same pressure drop across it as a tubing 65 feet long which has an internal diameter of 3/16 of an inch for the first ten feet, 4/16 of an inch for the next ten feet, 5/16 of an inch for the next 20 feet, and 6/16 of an inch for the next 25 feet.

I claim as my invention:

1. Apparatus for producing an emulsifiable multi-phase production fluid from a high-pressure oil well into a low pressure conduit, said apparatus comprising a well casing extending into a high-pressure well, wellhead means closing the top of said well casing, said wellhead means including a production fluid flowline therefrom, valve means in said flowline, a portion of said flowline downstream of said valve means consisting of at least one elongated length of small-diameter tubing for controlling the rate of flow of fluid from said well, the length of said tubing being sufficient to maintain the fluid velocity within the tubing below critical velocity while reducing the pressure of said fluid to a predetermined value.

2. Apparatus for producing an emulsifiable multi-phase production fluid from a high-pressure oil well into a low pressure conduit, said apparatus comprising a well casing extending into a high-pressure well, wellhead means closing the top of said well casing, said wellhead means including a production fluid flowline therefrom, motor-operated valve means in said flowline, timing means operatively connected to said valve means for intermittently actuating said valve means, a portion of said flowline downstream of said valve means consisting of at least one elongated length of small-diameter tubing for controlling the rate of flow of fluid from said well, the length of said tubing being sufficient to maintain the fluid velocity within the tubing below critical velocity while reducing the pressure of said fluid to a predetermined value.

3. Apparatus for producing an emulsifiable multi-phase production fluid from a high-pressure oil well into a low pressure conduit, said apparatus comprising a well casing extending into a high-pressure well, wellhead means closing the top of said well casing, said wellhead means including a production fluid flowline therefrom, motor-operated valve means in said flowline, timing means operatively connected to said valve means for intermittently actuating said valve means, a portion of said flowline downstream of said valve means consisting of at least one elongated length of small-diameter tubing for controlling the rate of flow of fluid from said well, the length of said tubing being sufficient to maintain the fluid velocity within the tubing below critical velocity while reducing the pressure of said fluid to a predetermined value, the downstream portions of said tubing being successively larger in diameter.

4. Apparatus for producing an emulsifiable multi-phase production fluid from a high-pressure oil well into a low pressure separator device, said apparatus comprising a well casing extending into a high-pressure well, wellhead means closing the top of said well casing, said wellhead means including a production fluid flowline therefrom, motor-operated valve means in said flowline, timing means operatively connected to said valve means for intermittently actuating said valve means, a portion of said flowline downstream of said valve means consisting of at least one elongated length of small-diameter tubing for controlling the rate of flow of fluid from said well, the length of said tubing being sufficient to maintain the fluid velocity within the tubing below critical velocity while reducing the pressure of said fluid to a predetermined value, the downstream portions of said tubing being successively larger in diameter, and separator means in communication with the discharge end of said production flowline for separating the various phases of said production fluid at low pressure.

References Cited in the file of this patent

UNITED STATES PATENTS

| | | |
|---|---|---|
| 2,245,210 | McElwaine | June 10, 1941 |
| 2,316,383 | Abercrombie | Apr. 13, 1943 |
| 2,322,453 | Kaveler | June 23, 1943 |